United States Patent [19]

McMullin, Jr.

[11] 4,218,325

[45] Aug. 19, 1980

[54] APPARATUS FOR SEPARATION OF SUSPENSIONS

[76] Inventor: Edward J. McMullin, Jr., 3165 Decatur Ave., Bronx, N.Y. 10467

[21] Appl. No.: 7,272

[22] Filed: Jan. 29, 1979

[51] Int. Cl.$^2$ ............................................. B01D 21/02
[52] U.S. Cl. ..................................................... 210/521
[58] Field of Search .................. 210/521, 522, 320, 83

[56] References Cited

U.S. PATENT DOCUMENTS

| | | | |
|---|---|---|---|
| 1,135,997 | 4/1915 | Door | 210/521 |
| 1,248,374 | 11/1917 | Moore | 210/521 |
| 2,118,157 | 5/1938 | Camp | 210/521 |
| 2,205,199 | 6/1940 | Hubbel et al. | 210/521 |
| 3,346,122 | 10/1967 | Cornelissen | 210/522 |
| 3,494,475 | 2/1970 | Hedstrom et al. | 210/521 |
| 3,552,554 | 1/1971 | Olgard | 210/521 |
| 3,703,467 | 11/1972 | Lummas et al. | 210/522 |
| 3,706,384 | 12/1972 | Weijman-Hane | 210/522 |
| 3,928,209 | 12/1975 | Engdahl et al. | 210/522 |

*Primary Examiner*—Frank Sever
*Attorney, Agent, or Firm*—Sprung, Felfe, Horn, Lynch & Kramer

[57] ABSTRACT

A separator for separating a solid or liquid from a liquid in which the former is suspended. In sedimentation (FIG. 1) the suspension is introduced into the lower end of plate stack 10 which is made up of plates 11. The clarified liquid flows out of the upper end of the plate stack and is withdrawn through conduit 32, while the separated material, e.g. solids, falls from the sides of the lower end of the plate stack into collector 33. Baffles 12 are disposed between the plates adjacent the lower end of the plate stacks and the baffles direct the incoming suspension toward the centerlines of the plates. This provides a zone of reduced velocity in the area adjacent the downstream side of the baffles, and results in more efficient removal of settled material from the plates.

12 Claims, No Drawings

APPARATUS FOR SEPARATION OF SUSPENSIONS

BACKGROUND OF THE INVENTION

This invention relates to the separation of solid-liquid or liquid-liquid suspensions employing inclined settling surfaces by either gravity sedimentation or floatation. In sedimentation, two of the basic design constraints are: the detention time within the settling chamber must be equal to or in practical application, greater than the time required for the denser component to settle to the floor of the chamber; and the means employed to remove the settled component from the chamber floor must minimize re-entrainment of the settled component.

The first condition can be satisfied by the use of a simple tank the volume of which is great enough to provide the required detention time as, for instance in U.S. Pat. Nos. 2,118,157 and 2,205,199. Such a design, however, is inefficient in that the ratio of throughput volume to detention volume is low. The efficiency can be greatly improved by installing a number of plates within the detention tank, disposed one above the other and generally parallel to each other and to the horizontal. Thereby each plate functionally provides a settling chamber. Such an arrangement is disclosed for instance, in U.S. Pat. Nos. 1,248,374 and 1,135,997. The increased efficiency of the design primarily results from the decreased distance the denser component must travel before settling out from the liquid being clarified.

Upon settling to the chamber floor the denser component can be considered removed from the flow stream since a velocity profile viewed along the direction of the flowing stream and from the side of the chamber shows a maximum along the center line of the chamber and zero at the upper and lower boundries (plates) of the chamber. Thus settled material normally is not subjected to sufficient force (from the flowing fluid) to cause it to re-enter the flow stream (re-entrainment).

Horizontally disposed plates possess the highest theoretical efficiency. However, in practice the value is considerably lowered by the actions of the various mechanisms employed to remove the settled material from the plates. Such mechanisms usually employ mechanical or hydraulic scrapers which cause considerable re-entrainment. Also in some designs the flow must be stopped for the duration of the removal process.

The practical efficiency of parallel plate separators can be increased by inclining the plates to the horizontal at some suitable angle. This inclination allows the force of gravity to cause the settled material to slide down and off the plates and into a collecting chamber or plenum. U.S. Pat. Nos. 3,706,384, 3,928,209, and 3,552,554 are examples of such devices. The first two are upflow sedimentation units, i.e. the suspension is injected into the bottom of the chamber containing the plates and flows upwardly while the settled material flows downwardly. The third is an example of a "downflow" sedimentation unit in which both the suspension and the settled material flow in a downwardly direction.

The upflow units illustrate two different approaches to injection of the suspension into the settling chamber. In both devices the injected fluid rapidly fans out to occupy the entire flow area within the chamber. The region between the point or points of injection and the location where the flow profile is completely developed is termed the transition region. It can be shown, both from hydraulic theory and from experimental observation, that transient turbulent eddys continuously form within this transition region. In order to be removed from the settling chamber, the settled material, which slides down the plates, must travel through this transition region and is thus subject to a degree of re-entrainment caused by interaction with the turbulent eddys. The tendency for re-entrainment to occur is increased by the increasing thickness of the settled material due to accumulation as the bottom of the flow chamber is approached. This causes a decrease in the area available for the upflowing fluid and results in an increased upflow velocity and an increase in the number and magnitude of turbulent eddys. These difficulties may be overcome by: increasing the height of the settling chamber; decreasing the upflow velocity; restricting the unit to suspensions with relatively low suspended material volumes. These minipulations all result in a unit possessing lowered efficiency.

The downflow unit mentioned above removes the settled material by causing the material to pass between the plates over which it is traveling and a clarified liquid collecting channel mounted on and projecting downwardly from the overlying plate of the chamber. Hereinafter, the passage between the lower plate and the collecting channel will be called the settled material collecting trough or "trough."

The settled material within the trough exhibits a great tendency to "bridge", i.e. the height of the settled material layer equals the height of the trough. Then frictional forces greatly retard further downward movement. Since the height of the material is rarely uniform across the width of the settling plates (due to turbulent eddys adjacent the inlet) portions of the trough are frequently bridged. Such bridging causes material to pile up behind the blockage and results in re-entrainment which is especially critical since it occurs adjacent to the effluent collector. The tendency to bridge can be reduced by: increasing the height of the trough, which in practice amounts to increasing the height of the settling chamber; increasing the downflow velocity, to increase the momentum of the settled material entering the trough; or increasing the angle of inclination of either the entire settling chamber or of that portion in the vicinity of the trough. These methods all result in units with decreased efficiency.

THE INVENTION

The instant invention overcomes the disadvantages discussed above by employing one or more baffles or walls which extend into the flow stream from each side of the inclined flow chamber. See FIG. 2, the baffles 12. The baffles are best oriented normal to the overlying and underlying plates (plates 11a and 11b in FIG. 3) and are inclined at some suitable angle relative to the direction of flow. An angle of 40°–55° has been found to be optimum. The baffles cause the influent flow to be directed towards the center of the settling chamber and cause a region of substantially reduced flow, termed a flow shadow, behind and extending down stream from the baffles to the end of the transition region.

In operation substantially all of the settling material settles to the floor of the chamber at some point down stream of the transition region. Then the material slides down the plate due to gravity. As the settled material approaches and enters the transition region it encounters a continuously increasing velocity in the central portion of the chamber. The velocity profile across the width of the plate in the transition region is roughly parabolic. The velocity gradient causes the settled material to move toward the sides of the chamber, out of the turbulent eddy region and into the flow shadows. Within the flow shadows the settled material slides down the plate at an increased rate until the baffles are encountered, at which point the inclined surfaces of the baffles direct the material to the sides of the chamber where it passes through openings in the chamber sides and into a solids collection chamber. Bridging within the flow shadows is prevented by providing openings (e.g. slots 13 in FIG. 3) to allow a small portion of the influent flow to flow across the baffle and enter the flow shadow region. This flow causes partial fluidization, i.e. an increase in the fluidity, of the settled material without re-entrainment occuring; as a result, the tendency to bridge can be reduced to any desired degree and the settled material will move freely out of the settling chamber. A further benefit is that the fluidization causes the smaller particles of settled material to flocculate, i.e. grow larger.

THE DRAWINGS

The invention will be understood by reference to the accompanying drawings, of which:

FIG. 2 is a schematic plan view of a portion of the plate stack of the apparatus shown in FIG. 1;

FIG. 3 is taken along line 3—3 of FIG. 2;

FIG. 4 is taken along line 4—4 of FIG. 2;

FIG. 5 is a partially schematic side elevation view of the device shown in FIG. 1 taken along line 5—5 in FIG. 6, with parts broken away;

FIG. 7 is a schematic, end elevation view of the device shown in FIG. 1.

Figure 1:
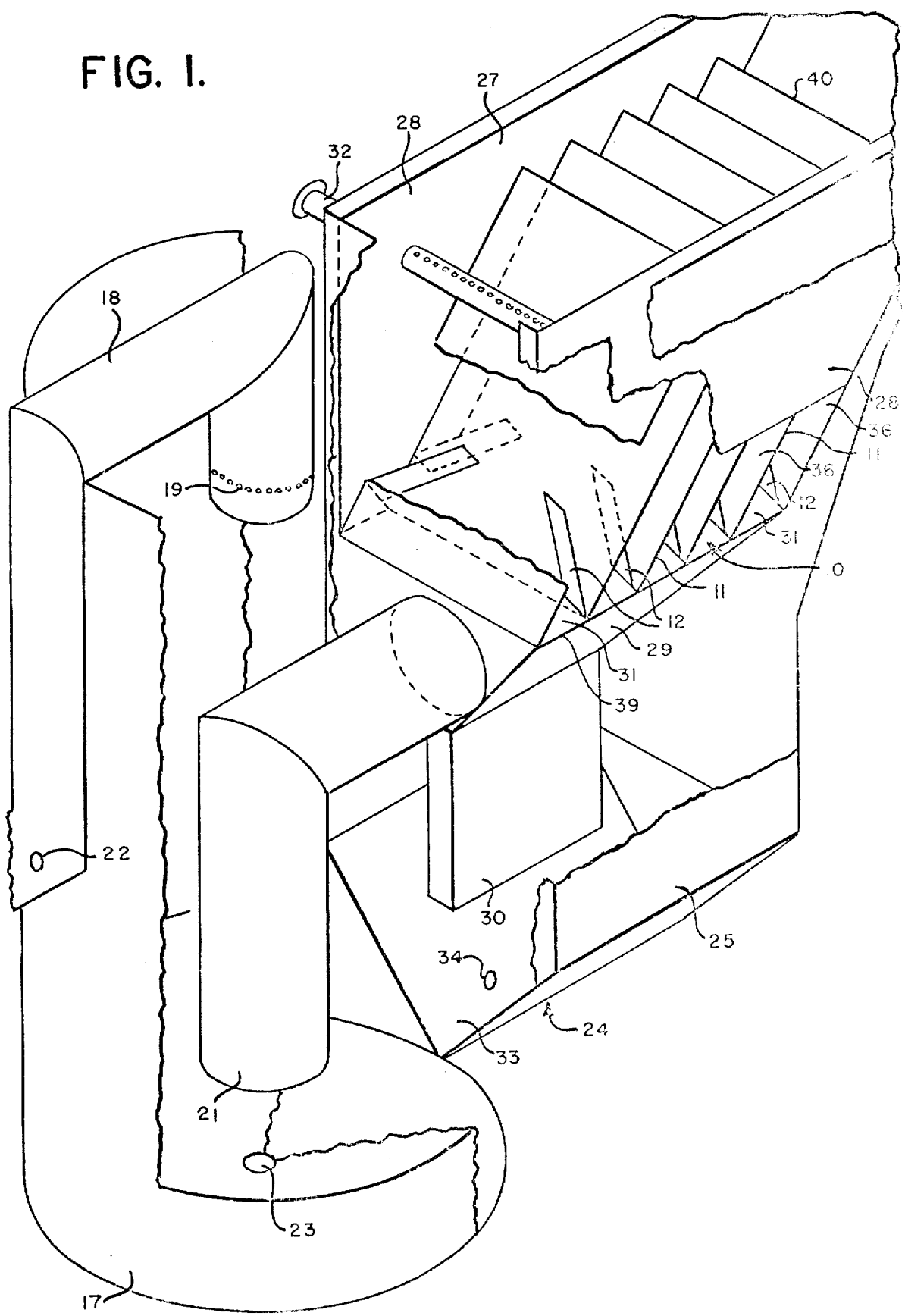
FIG. 1 is an isometric view of a separator of the invention with parts partially broken away.

Referring to FIGS. 1-4, the plate stack 10 includes a plurality of spaced plates 11 which are inclined to the vertical and are disposed in a generally parallel array. The device illustrated is intended for sedimentation, and is outfitted with baffles 12, disposed between the plates adjacent the lower end of the plate stack where a liquid-solids mixture to be separated enters the plate stack. FIG. 2 is a schematic view, looking at one of the plates from above and along a line generally perpendicular to the plate, and taken with FIG. 3 and FIG. 4, illustrate the construction and positioning of the baffle. Referring to FIGS. 2-4, two plates 11a and 11b are shown, with baffles 12 disposed between the plates. The construction illustrated is a preferred construction in that the baffles 12 terminate short of the lower plate 11b, so that slots 13 are provided which extend substantially over the length of the baffles.

The flow pattern of the liquid-solid mixture upwardly between the plates is illustrated in FIG. 2 and 4 by arrows. Referring to FIG. 2, the baffles direct the incoming liquid solids mixture toward the centerlines of the plates parallel to the inclination of the plates, i.e. toward the center line 14. By reason of the baffles, also, there is provided a reduced velocity in the area 16 adjacent the downstream side of the baffles. By reason of the construction according to the invention, the separator operates with improved efficiency, in the sense that for a given unit size, a higher throughput of material to be treated can be practiced. While it is not intended to predicate the claims on any particular theory with respect to the reason for the improvement, it is observed that the baffles result in a velocity profile downstream of the baffles which is such that a velocity shadow, so to speak, is provided in the area 16 adjacent the downstream side of the baffles. In that area the upward velocity of the liquid is reduced so that the separated solid particles do not have to move through a relatively swift liquid current. Also, the flow pattern as the liquid-solids mixture moves upwardly between the plates, is such that the solids are swept to the sides of the plate stack so that after falling onto a plate, they move downwardly along the plate through liquid overlying the baffles.

The slot 13 (FIG. 3 and FIG. 4) while not always essential, is preferred. The function of the slot is to affect the operation in such a way that excessive accumulation of solids on the plates adjacent the sides of the plate stack, and generally in the lower parts of the plate stack, is prevented. In the absence of the slots or other means permitting some flow of liquid across the baffles, accumulation of solids may occur to the extent that the operation is substantially interfered with. The provision of slots 13, provides a flow pattern as is indicated in FIG. 4, downstream of the baffles 12, and the current prevents the accumulations.

Where floatation is practiced, the converse of the construction illustrated would be utilized in that the baffles would be disposed adjacent the top of the plate stack, and the slots would be disposed adjacent the upper plate of each plate pair. The liquid-solids mixture would be introduced at the upper end of the plate stack, and would move downwardly through the stack.

DETAILED DESCRIPTION OF THE ILLUSTRATED CONSTRUCTION

Figure 6:
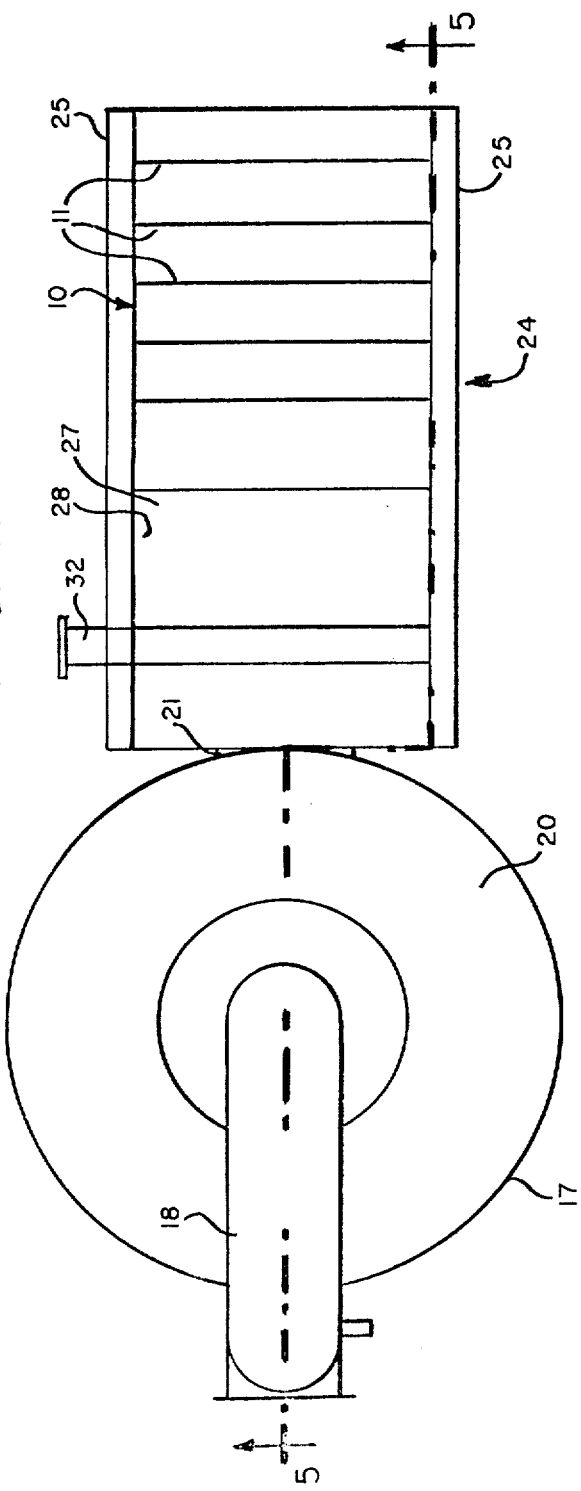
FIG. 6 is a schematic, plan view of the device shown in FIG. 1.

Referring to FIG. 1 and FIGS. 5-7, the apparatus illustrated, which it is to be recognized is merely representative of apparatus according to the invention, comprises a flocculator 17 having an inlet conduit 18, terminating in a distributor 19, baffle 20, and transfer conduit 21. A chemical for flocculation can be introduced through inlet 22, which is disposed in the inlet conduit 18. The flocculator is also provided with a drainout 23 which is normally sealed.

The transfer conduit 21 conveys the liquid-solids mixture to the separator 24. The separator 24 comprises an outer shell 25, in which the plate stack module 27 is mounted. The module 27 comprises the plate stack 10 having the baffles 12, sidewalls 28 to which the plates 11 are secured as by welding, a collector 29 to which the lower corners of the plates 11 are secured as by welding, the trough 30, and the small triangular plates 31 which prevent communication between the collector 29 and the outside of the module adjacent the bottoms of the plates 11. The apparatus also includes a outlet conduit 32 for the clear liquid. The lower part 33 of the outer shell 25 provides a solids collection chamber, and is provided with drainouts 34 which are normally closed.

In operation, the liquid-solids mixture enters the collector 29 from the transfer conduit 21, and passes upwardly between the plates 11. The solids fall onto the plates and move down the plates toward the baffles 12. At the same time, the solids move outwardly towards the sides of the plate stack and, for the most part fall through openings 36 from the plate stack into the solids collecting chamber 33. Any solids passing through slots 13 under the plates 11 (FIG. 3) will fall into the collector 29. Also, some settling and separation will occur in the collector 29 before the mixture enters the plate stack. All of the solids separating in the collector 29 falls into the trough 30, which conveys such solids to the solids collecting chamber 33. The device is operated in a manner such that the level of the separated solids in the solids collection chamber 33 is above the bottom of the trough 30, and, further, so that some compaction of the solids occurs in the solids collection chamber. Some thickening occurs in the solids collection chamber. Accordingly, as is shown in FIG. 5, a clear liquid draw off 37 is provided at a relatively high level of the outer shell 25.

The clear liquid moves upwardly and out of the plate stack into the upper part of the plate stack module and is withdrawn via the clear liquid outlet conduit 32. The device is constructed and operated so that liquid must traverse the plate stack in order to get from the transfer conduit 21 to the clear liquid outlet conduit 32, and so that the liquid collecting in the upper part of the unit does not overflow the unit. In steady state operation the level in the module, the level in the space between the module and the outer shell, and the level in the flocculator are approximately the same.

If desired, a pulsation can be imparted to the liquid undergoing separation to cause partial fluidization of the sludge without causing re-entrainment thereof. The pulsation could be provided, for example, by suitably mounted pistons. Pulsation, as well as the eddy currents resulting from the effect of the baffles 12, tend to promote flocculation.

EXAMPLE

Operation of a pilot plant incorporating this invention demonstrated its superior performance, especially in regard to clarifying suspensions of high volume percent of suspended material. The apparatus used had two plates providing the settling chamber. Settling chamber dimensions were: height (measured normal to the plates), 0.75 inches; width, 2 feet; length, 5 feet. Angle of inclination, from the horizontal, 45°. Volume throughput, 3.5 gpm/chamber. Volume of suspended material in the influent, 15% (after 10 minutes settling). Effluent turbity, less than 5 TU. The suspension clarified was produced by flocculating an influent water containing a 100 ppm bentonite clay, with American Cyanamid 573C, a cationic polyelectrolyte.

SCOPE OF THE INVENTION

As indicated above, the embodiment illustrated is merely representative of the invention. Broadly, the invention provides an improvement in a separator for separating a contaminant which can be a liquid or a solid from a liquid by sedimentation or floatation for separation of the liquid. Such a separator comprises a plate stack including a plurality of spaced plates inclined to the vertical and disposed in a generally parallel array providing lower and upper plate stack ends. A first conduit means is provided for introducing the liquid containing the contaminant into the plate stack at one of said ends for travel of liquid through the plate stack to the other of said ends, and travel of the contaminant to the end of the plate stack to which the liquid containing contaminant is introduced. In the case of sedimentation, the first conduit means is arranged for introducing the liquid containing the contaminant into the plate stack at the lower end thereof, while for floatation, the first conduit means would be provided for introducing the liquid containing the contaminant into the upper end of the plate stack. A second conduit is provided for withdrawing the clarified liquid at the upper or lower end depending on whether sedimentation or floatation is performed. The apparatus further comprises housing means for providing and confining flow of the liquid from the first conduit means to the second conduit means to passage through the plate stack. The invention provides an improvement comprising baffle members disposed between the plates adjacent the first conduit for directing the incoming liquid containing solids towards the center lines of the plates parallel to the inclination thereof and for providing a zone of reduced velocity in the area adjacent the downstream side of the baffles.

In a preferred embodiment, means are provided for passage of liquid across the baffles for agitating solids in the vicinity of the downstream side of the baffles. In the embodiment of the drawing, the slots 13 provide such passage of liquid across the baffles. Desirably the means provided for such passage are disposed adjacent the plates on which the separated solids tend to collect. Any openings permitting passage of some liquid across the baffles will improve the operation in that excessive accumulation of solids will thereby be prevented or reduced. The baffles could be perforated at any location or slots could be provided adjacent the plates opposite the plates on which the separated solids tend to collect.

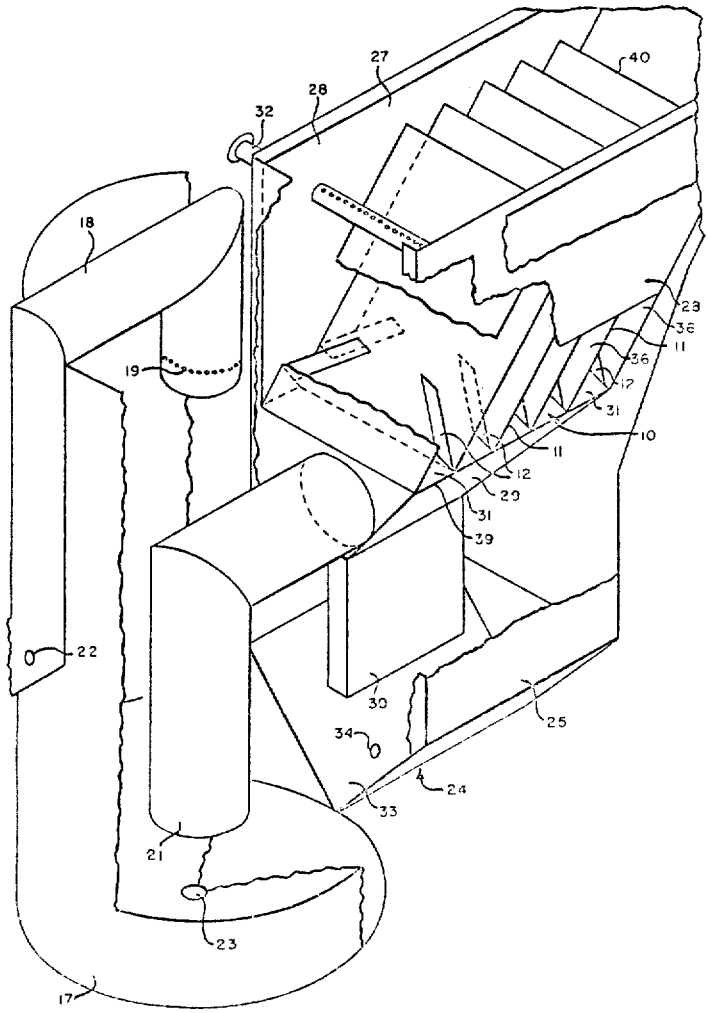

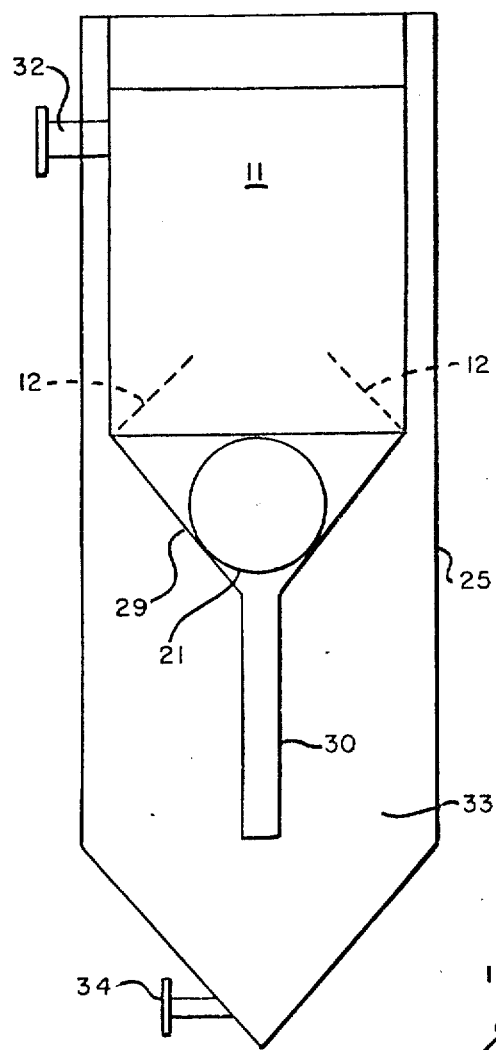
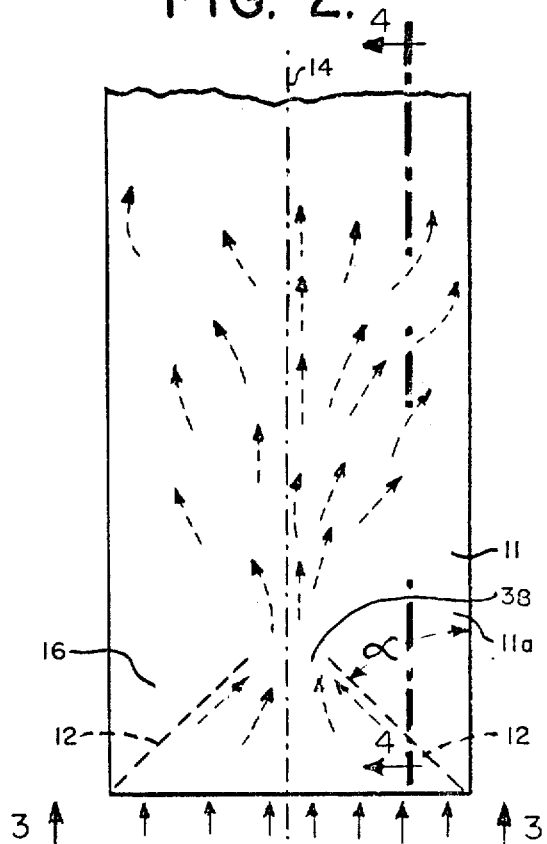
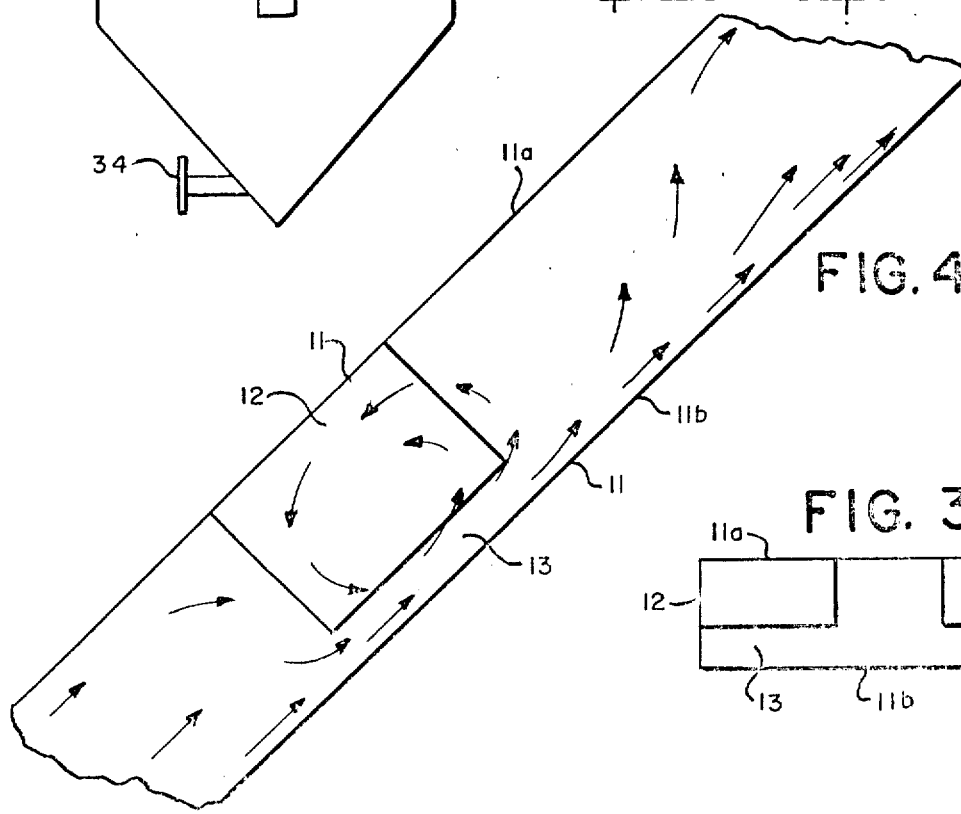

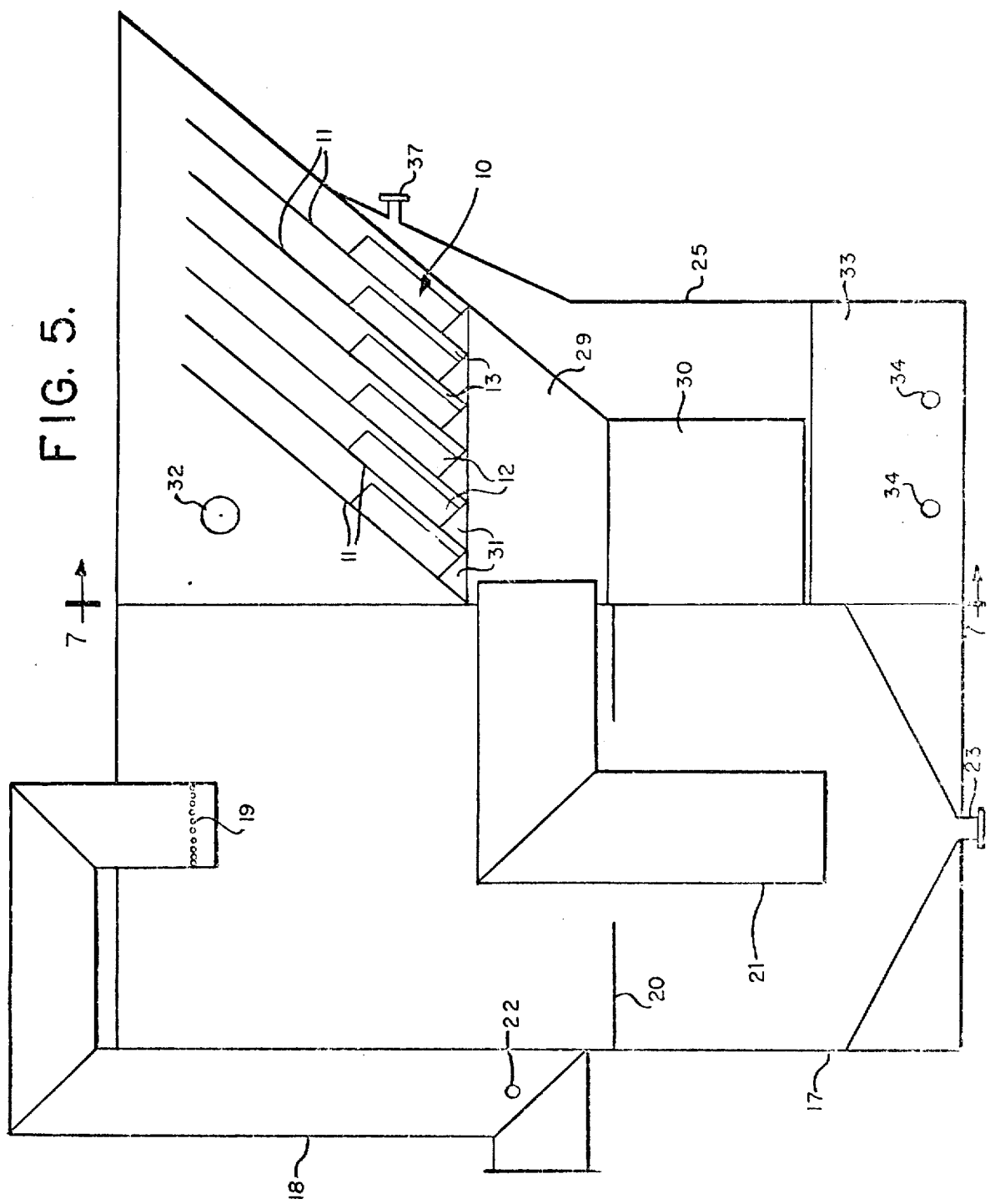

What is claimed is:

1. In a separator for separating a contaminant from a liquid by sedimentation or floatation for separation of the contaminant from the liquid, comprising a plate stack including a plurality of spaced plates inclined to the vertical and disposed in a generally parallel array providing lower and upper plate stack ends, first conduit means for introducing the liquid containing the contaminant into the plate stack at one of said ends for travel of the liquid through the plate stack to the other of said ends and travel of said contaminant to the end of the plate stack to which the liquid containing contaminant is introduced for the sedimentation or floatation and the separation, second conduit means for withdrawing the separated liquid, and housing means for confining flow of the liquid from the first conduit means to the second conduit means to passage through the plate stack, the improvement which means for directing the incoming liquid containing contaminant so as to provide a zone of reduced velocity in the area adjacent the downstream side of the baffles such that the contaminant slides down the plates at an increased rate said means for directing consisting essentially of baffle means disposed between the plates adjacent the first conduit means.

2. Separator of claim 1, the baffle members being disposed adjacent the lower end of the plate stack for using the separator for sedimentation.

3. Separator of claim 1, the baffle members being disposed adjacent the upper end of the plate stack for using the separator for floatation.

4. Separator of claim 1, 2, or 3 and means for flocculation of the contaminant in communication with the first conduit means, for flocculation of the contaminant before passage thereof into the plate stack.

5. Separator of claim 4, and a contaminant collection chamber in communication with the plate stack for receiving contaminant separated from the liquid for thickening of the separated material.

6. Separator of claim 1, 2, or 3 and a contaminant collection chamber in communication with the plate stack for receiving contaminant separated from the liquid for thickening of the separated material.

7. Separator of claim 5, and means for passage of liquid across the baffles for agitating separated contaminant in the vicinity of the downstream side of the baffles.

8. Separator of claim 7, and the means for passage of liquid across the baffles being disposed adjacent the plates on which the separated contaminant tends to collect.

9. Separator of claim 8, the means for passage of liquid across the baffles being a slot extending substantially over the length baffle.

10. Separator of claim 1, 2, or 3, and means for passage of liquid across the baffles for agitating separated contaminant in the vicinity of the downstream side of the baffles.

11. Separator of claims 1, 2, or 3, the baffles being disposed for directing the incoming liquid toward the centerlines of the plates parallel to the inclination thereof.

12. Separator of claim 11, and means for passage of liquid across the baffles for agitating separated contaminant in the vicinity of the downstream side of the baffles.

* * * * *

UNITED STATES PATENT AND TRADEMARK OFFICE
CERTIFICATE OF CORRECTION

PATENT NO. : 4,218,325

DATED : August 19, 1980

INVENTOR(S) : Edward J. McMullin, Jr.

It is certified that error appears in the above—identified patent and that said Letters Patent is hereby corrected as shown below:

The title page should be deleted to appear as per attached title page and the attached 4 sheets of drawings should be inserted as part of the above-identified patent.

Signed and Sealed this

Twenty-fifth Day of November 1980

[SEAL]

Attest:

SIDNEY A. DIAMOND

Attesting Officer — Commissioner of Patents and Trademarks

United States Patent [19]

McMullin, Jr.

[11] 4,218,325
[45] Aug. 19, 1980

[54] APPARATUS FOR SEPARATION OF SUSPENSIONS

[76] Inventor: Edward J. McMullin, Jr., 3165 Decatur Ave., Bronx, N.Y. 10467

[21] Appl. No.: 7,272

[22] Filed: Jan. 29, 1979

[51] Int. Cl.² ............................................ B01D 21/02
[52] U.S. Cl. .................................................. 210/521
[58] Field of Search ................... 210/521, 522, 320, 83

[56] References Cited

U.S. PATENT DOCUMENTS

| | | | |
|---|---|---|---|
| 1,135,997 | 4/1915 | Door | 210/521 |
| 1,248,374 | 11/1917 | Moore | 210/521 |
| 2,118,157 | 5/1938 | Camp | 210/521 |
| 2,205,199 | 6/1940 | Hubbel et al. | 210/521 |
| 3,346,122 | 10/1967 | Cornelissen | 210/522 |
| 3,494,475 | 2/1970 | Hedstrom et al. | 210/521 |
| 3,552,554 | 1/1971 | Olgard | 210/521 |
| 3,703,467 | 11/1972 | Lummas et al. | 210/522 |
| 3,706,384 | 12/1972 | Weijman-Hane | 210/522 |
| 3,928,209 | 12/1975 | Engdahl et al. | 210/522 |

*Primary Examiner*—Frank Sever
*Attorney, Agent, or Firm*—Sprung, Felfe, Horn, Lynch & Kramer

[57] ABSTRACT

A separator for separating a solid or liquid from a liquid in which the former is suspended. In sedimentation (FIG. 1) the suspension is introduced into the lower end of plate stack 10 which is made up of plates 11. The clarified liquid flows out of the upper end of the plate stack and is withdrawn through conduit 32, while the separated material, e.g. solids, falls from the sides of the lower end of the plate stack into collector 33. Baffles 12 are disposed between the plates adjacent the lower end of the plate stacks and the baffles direct the incoming suspension toward the centerlines of the plates. This provides a zone of reduced velocity in the area adjacent the downstream side of the baffles, and results in more efficient removal of settled material from the plates.

12 Claims, 7 Drawing Figures